(12) United States Patent
Bidiville et al.

(10) Patent No.: US 6,552,716 B1
(45) Date of Patent: Apr. 22, 2003

(54) TRANSMISSION OF DIFFERENTIAL OPTICAL DETECTOR SIGNAL OVER A SINGLE LINE

(75) Inventors: Marc Bidiville, Pully (CH); Bernhard Joss, Bussigny (CH)

(73) Assignee: Logitech Europe, S.A., Romanel-sur-Morges (CH)

( * ) Notice: Subject to any disclaimer, the term of this patent is extended or adjusted under 35 U.S.C. 154(b) by 0 days.

(21) Appl. No.: 09/305,730

(22) Filed: May 5, 1999

(51) Int. Cl.[7] .................................................. G09G 5/08
(52) U.S. Cl. ...................... 345/165; 345/164; 345/166; 250/559.39; 250/206.1
(58) Field of Search ................................ 345/163, 164, 345/165, 166; 250/559.39, 206.1, 208.2, 559.2

(56) References Cited

U.S. PATENT DOCUMENTS

| | | | | |
|---|---|---|---|---|
| 4,132,314 A | * | 1/1979 | Von Beckmann et al. | 209/565 |
| 5,680,157 A | * | 10/1997 | Bidiville et al. | 345/165 |
| 5,801,554 A | * | 9/1998 | Momma et al. | 327/89 |
| 6,124,587 A | * | 9/2000 | Bidiville et al. | 250/221 |
| 6,154,078 A | * | 11/2000 | Stave | 327/263 |

* cited by examiner

Primary Examiner—Richard Hjerpe
Assistant Examiner—Kimnhung Nguyen
(74) Attorney, Agent, or Firm—Townsend and Townsend and Crew LLP

(57) ABSTRACT

A sensor for sensing movement of an encoder. At least two sensors are mounted adjacent the encoder. Each of the sensors provides an output corresponding to the amount of movement. A pair of comparators are connected to the sensors to provide two signal outputs. The comparator outputs are then provided to a digital encoding circuit which encodes the signals as a multi-bit serial value on a single output line. The bit value can be read by forcing control pulses onto the output line through an input buffer connected to the same line. The use of the single output line eliminates the extra output pin of the prior art, enabling a three pin package to be used.

12 Claims, 3 Drawing Sheets

TRANSMISSION OF DIFFERENTIAL OPTICAL DETECTOR SIGNAL OVER A SINGLE LINE

BACKGROUND OF THE INVENTION

The present invention relates to optical encoders for pointing devices, and in particular to photosensor circuitry for such optical encoders.

Pointing devices, such as mice and trackballs, are well known peripherals for personal computers and workstations. When the ball is moved on such a mouse or trackball, an encoder wheel biased against the ball moves as well, rotating the slots of the encoder wheel, which are positioned between the light emitter and detector. The light detector, by detecting the alternating periods of darkness and lightness, can provide a signal to the computer indicating the amount and direction of movement of the ball. Such an optical encoder can also be connected to a roller used on a mouse for scrolling and other movements.

One configuration for such an optical sensor is shown in a patent issued to the assignee of this application, U.S. Pat. No. 5,680,157, entitled "Pointing Device With Differential Optomechanical Sensing". This patent provides a plurality of photosensors to provide differential detection, with the differential signals being detected by comparators integrated on the same chip as the photosensors. The comparator outputs are provided to latches and then provided on separate output pins for a processor circuit that reads the sensors and provides signals to a computer. The present invention improves on the photosensor circuitry of this patent, and accordingly U.S. Pat. No. 5,680,157 is hereby incorporated herein by reference. A disadvantage of the device set forth in the above patent is the need for an extra pin, providing a total of four pins for the photosensor chip: pins for power and ground and two pins for the different comparator outputs. Other, non-differential sensors require only 3 pins. It would be desirable to provide a three pin configuration of a differential sensor to reduce cost.

Examples of semiconductor devices which use a single pin for both input and output are set forth in Dallas Semiconductor U.S. Pat. Nos. 5,210,846 and 5,809,519.

SUMMARY OF THE INVENTION

The present invention provides a sensor for sensing movement of an encoder. At least two sensors are mounted adjacent the encoder. Each of the sensors provides an output corresponding to the amount of movement. A pair of comparators are connected to the sensors to provide two signal outputs. The comparator outputs are then provided to a digital encoding circuit which encodes the signals as a multi-bit serial value on a single output line. The use of the single output line eliminates the extra output pin of the prior art, enabling a three pin package to be used. A pin is also saved on the receiver side (typically a microprocessor).

In one embodiment, an optical sensor is used for sensing light corresponding to the movement of an encoder. At least two photosensors are mounted on a side of the encoder opposite a light emitter. Each of the photosensors provides an output corresponding to the amount of light impinging on it. A pair of comparators are connected to the photosensors. In one embodiment, four photosensors are used to provide two differential signal outputs, with each of the comparators being connected to two of the photosensors.

In a preferred embodiment, the output line also has an input buffer which is used to clock the digital encoding circuit in response to a signal provided by the processor. The processor provides the control signal in synchronization with a pulsing of the light emitter. The digital encoding circuit self-resets to an initialized value upon the detection of a change in the sensor signal, without any control needed from the processor.

Additionally, the optical sensor preferably has an output buffer connected between the digital encoding circuit and the output line. The output buffer is designed with a limited drive capability so that the signal from the external processor to the input buffer will override the output buffer signal, allowing a control signal to be provided on the same line, even though the output buffer, providing an output signal, is coupled to it. Thus, the present invention essentially allows, in this embodiment, the output signal to be constantly provided, but to be overridden by a control signal to update the output signal in conjunction with a new pulsing of the light emitter.

In a preferred embodiment, the encoding circuit consists of a rotary encoder having inputs coupled to the comparators and providing parallel outputs. The parallel to serial converter interface circuit is connected between the rotary encoder and the output buffer.

For a further understanding of the nature and the advantages of the invention, reference should be made to the following description taken into conjunction with the accompanying drawings.

DESCRIPTION OF THE SPECIFIC EMBODIMENTS

Figure 1:
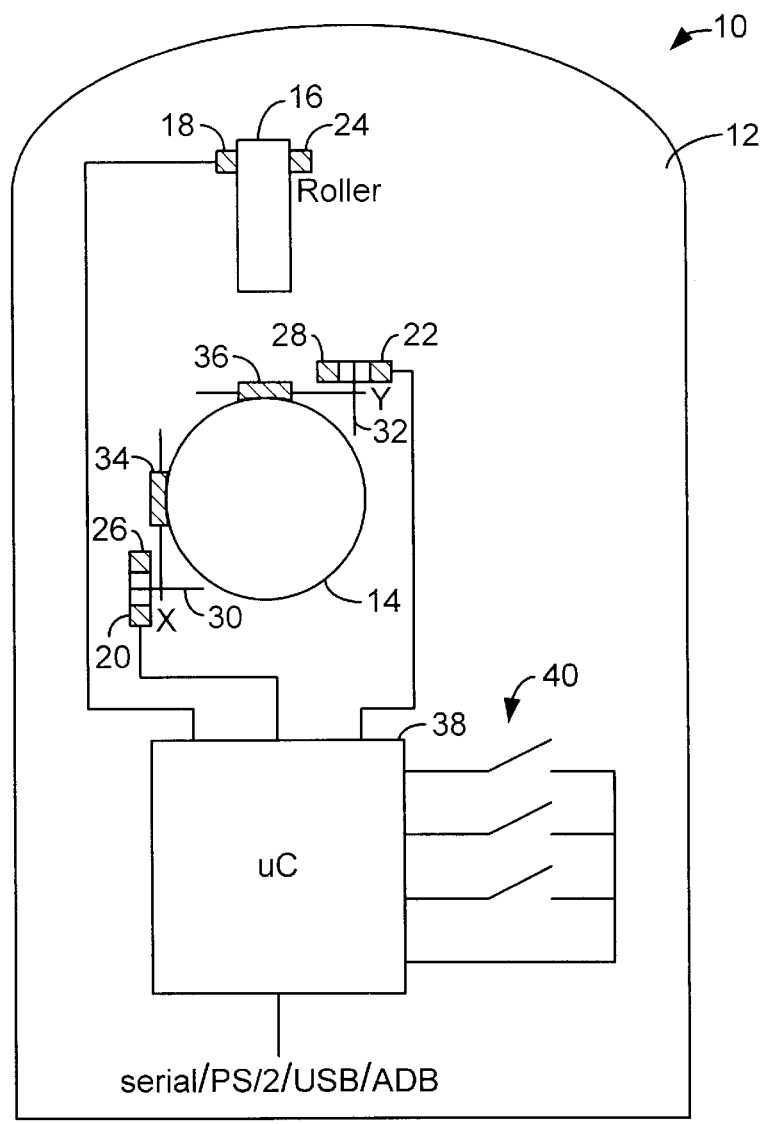
FIG. 1 is a diagram of a mouse or trackball incorporating the present invention.

FIG. 1 illustrates a mouse 10 having a housing 12. Mounted therein is a ball 14 and a roller 16, in a manner well known to those of skill in the art.

Three photosensor chips according to the present invention are shown as photosensor chips 18, 20, and 22. Chip 18 is mounted opposite a light emitter 24 on the other side of roller 16. Chips 20 and 22 are mounted opposite light emitters 26 and 28, each of which is on the other side of an encoder wheel 30 and 32, respectively. The encoder wheels are connected by shaft and rollers 34 and 36 to ball 14.

As shown, signal lines from the photosensors are provided to a microprocessor 38. Microprocessor 38 also detects the activation of multiple switches 40 on the mouse. The microprocessor can be connected to a computer by any number of protocols, such as a serial/PS2, USB or ADB.

Figure 2:
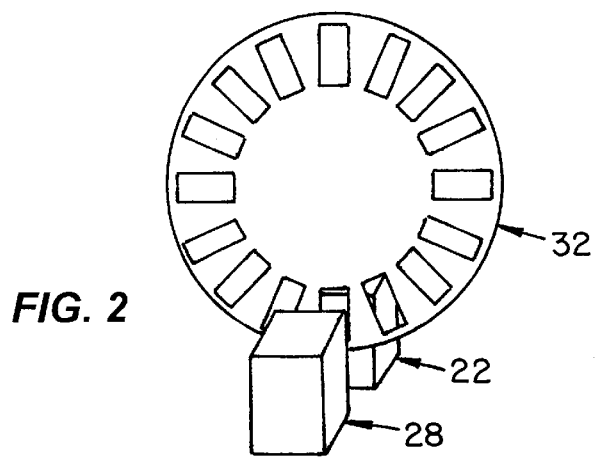
FIG. 2 is a diagram illustrating in more detail one of the encoder wheel and emitter/detector combinations to FIG. 1.

FIG. 2 illustrates in more detail one of the photosensor and encoder arrangements of FIG. 1. Shown is encoder wheel 32 having mounted on one side light emitter 28, and on the other side photosensor chip 22. As the encoder wheel turns, its slots pass between the emitter and the photosensor, allowing optical detection of the movement of the encoder wheel.

Figure 3:
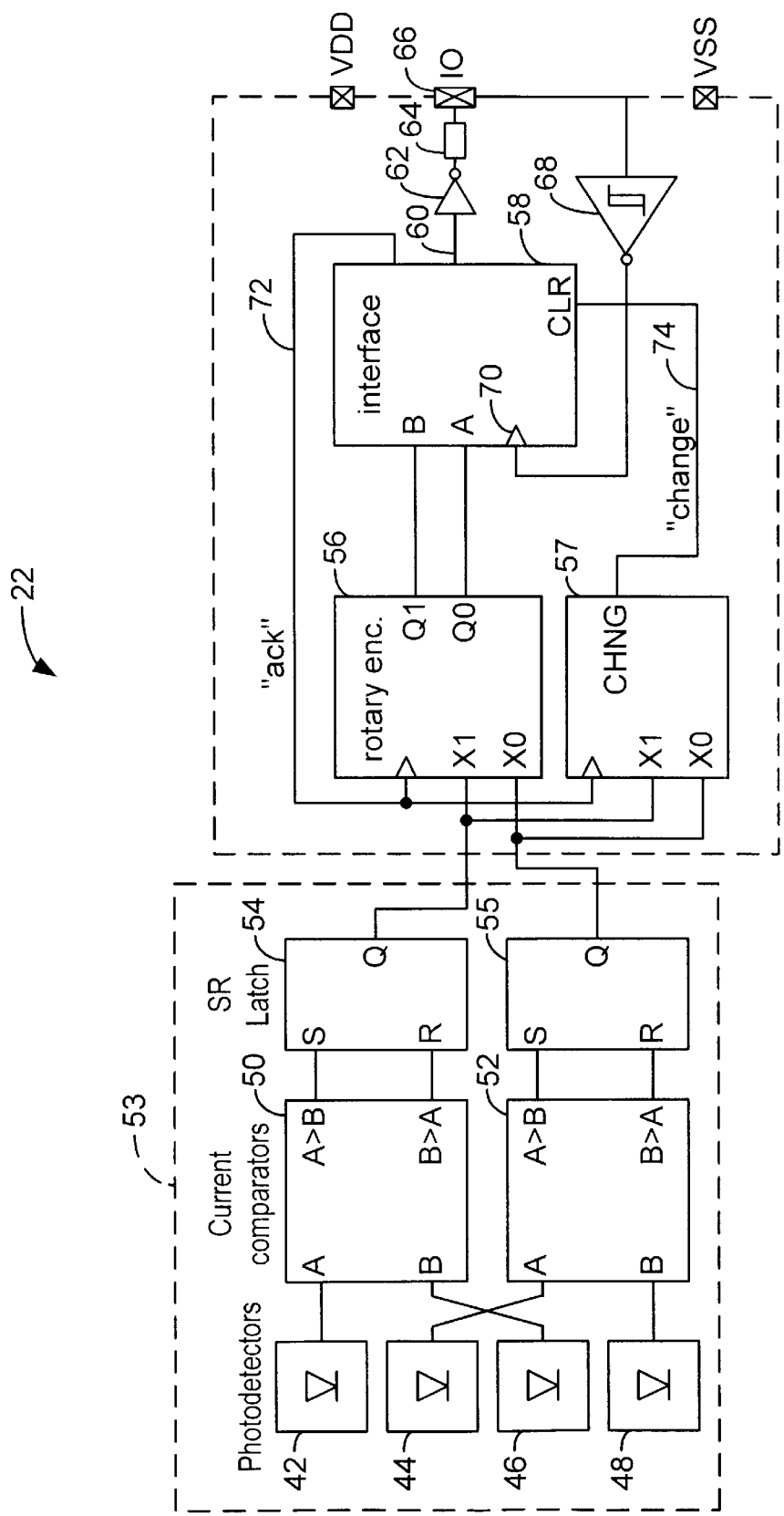
FIG. 3 is a block diagram of the circuitry of an embodiment of the photosensor circuit of the invention.

FIG. 3 is a block diagram of the electronics of a example photosensor chip 22. Shown are four photodetectors 42, 44, 46 and 48. Note that more photodetectors may be used, such as the arrangement set forth in U.S. Pat. No. 5,680,157, which has been incorporated herein by reference, which shows extra photodetectors to accommodate different disk pitches. Alternately, only two photosensors could be used with a fixed comparator level. The output of the photodetectors are provided to current comparators 50 and 52, as shown. The comparator outputs are provided to SR latches 54 and 55, as shown. The arrangement of the photodetectors, current comparators and SR latch in block 53 may be the same as set forth in U.S. Pat. No. 5,680,157.

Instead of the latches providing two outputs (as in U.S. Pat. No. 5,680,157), the two latches provide their parallel signals to the parallel inputs of a rotary encoder 56. The rotary encoder provides its output signals, when clocked, to a parallel to serial interface circuit 58. The signal output 60 of interface circuit 58 is provided to an output buffer and invertor 62, with associated resistance 64 as illustrated, to a single output pin 66. The resistance is used in one embodiment to make the output signal weak and capable of being over-ridden. It will be appreciated that other circuitry could be used instead of a resistor for this purpose. Output pin 66 is also provided to an input buffer 68, which provides a signal to a clock input 70 of parallel-to-serial converter interface 58.

Alternately, the rotary encoder could be omitted and it's function done in the external microprocessor. Including the rotary encoder on the chip with the sensor takes some burden off the microprocessor, making its code shorter. Of course additional code is required to extract the two bits in series.

In operation, an external processor or ASIC (Application Specific Integrated Circuit) will provide a control signal on pin 66 to input buffer 68 to clock the desired data out of interface 58. This will be preferably done after the LEDs are pulsed. Pulsing of the LEDs is a common technique used to conserve power. An ACK output 72 of parallel-to-serial interface 58 is used to clock the rotary encoder to provide the next encoded signal between the two parallel inputs of rotary encoder 56. Signal line 72 is an acknowledge signal to the encoder to let it know that the change has been read and that it has to be cleared (for the following readings) until a new movement is detected.

Also shown is a reset line 74 connected between the CHNG output of a synchronization circuit 57 and the clear input of parallel to serial interface 58. Line 74 is a synchronization line for synchronizing the emitter (sensor) and receiver (microprocessor). This aspect of the invention uses the fact that there is a change in one or both of the SR latch outputs to do this synchronization. Changes can only occur during a LED pulse (or slightly after due to signal propogation delay). Each time a change is detected, the parallel to serial converter is resynchronized. This is used, for example, after a power On and also after a "hiccup," due, for example, to an electro static discharge (ESD). Before synchronization or after loosing sync, as long as there is no change in the SR latches, a 00 is output, meaning no change is issued. As soon as a change occurs, the sync occurs. This is sufficient because reading 00 (="no change") will always yield 00, even if out of sync.

Figure 4:
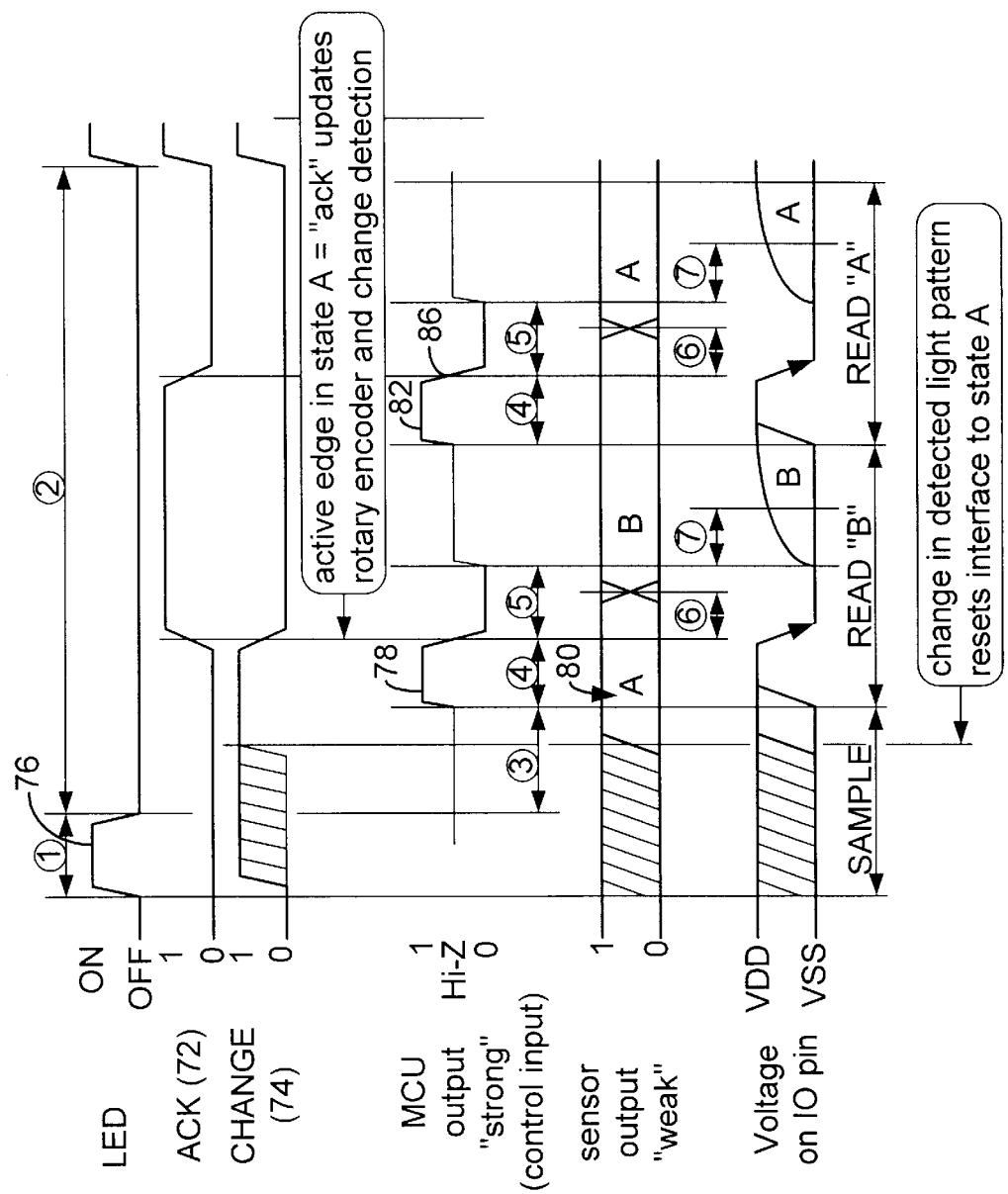
FIG. 4 is a timing diagram illustrating the input and output signals on a signal line coming out of the photosensor chip of the present invention, and the use of an acknowledge signal to synchronize the digital output.

The operation of the circuit of FIG. 3 can be understood with the help of the timing diagram of FIG. 4. FIG. 4 shows an LED pulse 76, which turns on the light emitter. Subsequently, an input pulse is provided to pin 66 through input buffer 68, shown as input pulse 78. The falling edge of this input pulse clocks interface 58. As can be seen, during this time, there is an output signal 80. As described above, this is a weak output signal from output buffer 62 and resistor 64, which is overridden by the Control input pulses (pulses 78 and 82 of FIG. 4). The voltage resulting on the I/O pin 66 is shown below. The voltage on the I/O pin has exaggerated curves to illustrate the slow rise time due to the low drive current and relatively large capacitive load.

Subsequently, the value "B" can be read out, followed by another input pulse 82, to again clock the parallel to serial interface 58. This then results in the value "A" being read. Set forth below is a table illustrating the encoding of the B and A signals. This encoding is merely an example, and other encoding could be used. Preferably, any other encoding would code "no change" as either "00" or "11" to guarantee that "no change" is reported until the first change occurs. The encoding is provided by the rotary encoder, which has two stages of flip-flops so it can know both a current state of the SR latches, and a previous states. From those two states, changes can be encoded, such as set forth in the table below.

| B A | output encoding |
|---|---|
| 0 0 | no change |
| 0 1 | edge moving 1 count: D1->D2->D3->D4->D1 X0 leading |
| 1 0 | edge moving 1 count: D4->D3->D2->D1->D4 /X1 leading |
| 1 1 | 2 counts any direction double transition |

The state of the output driver changes only due to a falling edge on the I/O pin, which is forced externally. The internal logic maintains an existing low output level, but is prevented from generating a falling edge. Therefore light on the photodetectors can only result in a rising edge. The purpose is to prevent light generated falling edges from clocking the parallel to serial converter, thus changing the output value and resulting in a loss of synchronization.

The two bit word is synchronized by resetting the interface to state "A" at each change of the outputs of the SR latches by means of a signal CHNG on line 74. An LED pulse which causes a change in the SR latches will produce the CHANGE signal 74. This signal forces the ACK output to zero on line 72 of the parallel to serial converter 58. Thus, after power up, or after an electrostatic discharge, for example, the state of the parallel to serial converter is automatically reset to A, without the need for any intervention by the external microprocessor.

Subsequently, the microprocessor (MCU) can send a clocking pulse. The clocking pulse initially goes to a high level, from a high impedance-state, to take control of the output line. Then it goes low for some time, then back to a high impedance state. This high to low level transition serves to both clock the output of parallel to serial converter on line 60, and to change the state of the ACK signal on line 72. The next falling edge 86 of second pulse 82 will change the state of ACK again. Thus, the rotary encoder clock on line 72 is generated at each time the selection is alternated between the A and B inputs of the parallel to serial converter. This causes the parallel to serial converter to alternately select between its A and B inputs, with a being selected when ACK is 0, and B being selected when ACK is 1.

The MCU doesn't know the value of the ACK signal, but doesn't need to due to the self-synchronization. The MCU only needs to send a signal to change the value of ACK.

As will be understood by those of skill in the art, the present invention may be embodied in other specific forms without departing from the essential characteristics thereof. For example, other encoding codes could be used and other specific circuitry could be used to allow the same pin to be used for the encoded output and clocking input. Alternately, more sensors could be used, such as for the technique to sense an irregularly speckled surface set forth in U.S. Pat. No. 5,729,009. In addition, instead of optical sensors, magnetic or other sensor types could be used.

In another variation, multiple encoders could be integrated on the same chip. For example, both the X and Y axis could be detected on the same chip, with one channel for each axis. The circuitry could be duplicated for each encoder, except that the parallel to serial converter and the input and output buffer would be shared. More pulses would be used to read out the data.

A number of alternate photodetector and comparator configurations are possible:

(a) Two photodetectors could be used with two comparators with one fixed (or adaptive) reference, and no SR latch.

(b) Two photodetectors could be used with four comparators with two fixed (or adaptive) references, and two SR latches.

(c) Four photodetectors could be used with four comparators and two SR latches.

(d) Multiple photodetectors with multiple comparators followed by a combination/sequential circuit which works by tracking the edges in the image projected on the sensor. This would be basically a low cost, simplified one dimensional version of the design in U.S. Pat. No. 5,729,009 (the Marble™ ball design).

In other embodiments, the comparator outputs could be ORed together and the result can be used instead of the CHANGE signal from the SR latches to synchronize the parallel to serial converter.

Accordingly, the above disclosure is intended to be illustrative, but not limiting, of the scope of the invention which is set forth in the following claims.

What is claimed is:

1. A sensor chip for sensing movement of an encoder, said sensor chip comprising:

at least two sensors, each of said sensors providing an electrical sensor output signal having an amplitude corresponding to an amount of movement of said encoder; a plurality of comparators coupled to said sensors to provide two signal outputs, said comparators being responsive to a plurality of said sensor output signals for comparing at least first and second ones of said sensor output signals and generating at least one comparator output signal representative of the magnitudes of said sensor output signals; and a digital encoding circuit, coupled to said comparators, to encode said comparator signals as a multi-bit serial value on a single output line of said sensor chip.

2. The sensor chip of claim 1 further comprising:

an input buffer, having an input coupled to said single output line and an output coupled to said digital encoding circuit to clock said multi-bit serial value out of said digital encoding circuit, such that said digital encoding circuit is operated under external control via said single output line also used to transmit said multi-bit serial value.

3. The sensor chip of claim 2 further comprising:

an output buffer coupled between said digital encoding circuit and said single output line, said output buffer having limited drive capability so that a signal from said output buffer can be overridden by a control signal provided to said input buffer.

4. The sensor chip of claim 1 wherein said digital encoding circuit comprises:

a rotary encoder having inputs coupled to said plurality of comparators and providing parallel outputs;

a parallel to serial converter interface circuit having inputs coupled to said parallel outputs of said rotary encoder; and a plurality of latches coupled between said comparators and said rotary encoder.

5. The sensor chip of claim 4 further comprising:

a circuit for generating a change signal responsive to a change in an output of at least one of said comparators, said change signal resetting said parallel to serial converter and said rotary encoder to a first state independent of any external electrical control signal.

6. An optical sensor chip for sensing light corresponding to movement of an encoder positioned between said optical sensor chip and a light emitter, said optical sensor chip comprising:

at least two photosensors, each of said photosensors providing an electrical photosensor output signal having an amplitude corresponding to an amount of light impinging on the respective photosensor;

a plurality of comparators coupled to said photosensors to provide two differential signal outputs, said comparators being responsive to a plurality of said photosensor output signals for comparing at least first and second ones of said photosensor output signals and generating at least one comparator output signal representative of the relative magnitudes of said photosensor output signals;

a digital encoding circuit, coupled to said comparators, to encode said comparator signals as a multi-bit serial value on a single output line of said optical sensor chip, said digital encoding circuit including a rotary encoder having inputs coupled to said plurality of comparators and providing parallel outputs, and a parallel to serial converter interface circuit having inputs coupled to said parallel outputs of said rotary encoder;

an input buffer, having an input coupled to said single output line and an output coupled to said digital encoding circuit to clock said multi-bit serial value out of said digital encoding circuit, such that said digital encoding circuit is operated under external control via said single output line also used to transmit said multi-bit serial value; and an output buffer coupled between said digital encoding circuit and said single output line, said output buffer having limited drive capability so that a signal from said output buffer can be overridden by a control signal provided to said input buffer.

7. A cursor control device for controlling the position of a cursor on a video display screen, comprising:

a housing;

a user movable input;

a rotary encoder coupled to said user movable input; and a sensor chip comprising:

at least two sensors mounted in said housing adjacent said rotary encoder, each of said sensors providing an electrical sensor output signal having an amplitude corresponding to an amount of movement of said rotary encoder;

a plurality of comparators coupled to said sensors to provide two differential signal outputs, said comparators being responsive to a plurality of said sensor output signals for comparing at least first and second ones of said sensor output signals and generating at least one comparator output signal representative of the relative magnitudes of said sensor output signals; and a digital encoding circuit, coupled to said comparators, to encode said comparator signals as a multi-bit serial value on a single output line of said sensor chip.

8. The device of claim 7 further comprising:

an input buffer, having an input coupled to said single output line and an output coupled to said digital encoding circuit to clock said multi-bit serial value out of said digital encoding circuit, such that said digital encoding circuit is operated under external control via said single output line also used to transmit said multi-bit serial value.

9. The device of claim 8 further comprising:

an output buffer coupled between said digital encoding circuit and said single output line, said output buffer having limited drive capability so that a signal from said output buffer can be overridden by a control signal provided to said input buffer.

10. The device of claim 7 wherein said digital encoding circuit comprises:

a rotary encoder having inputs coupled to said plurality of comparators and providing parallel outputs; and a parallel to serial converter interface circuit having inputs coupled to said parallel outputs of said rotary encoder.

11. The device of claim 7 wherein said user movable input comprises a ball.

12. The device of claim 7 wherein said user movable input comprises a roller.

\* \* \* \* \*